United States Patent
Lampin et al.

(10) Patent No.: US 9,100,962 B2
(45) Date of Patent: Aug. 4, 2015

(54) COMMUNICATION METHOD

(75) Inventors: Quentin Lampin, Grenoble (FR);
Dominique Barthel, Bernin (FR);
Isabelle Auge-Blum, Villeurbanne (FR);
Fabrice Valois, Lyons (FR)

(73) Assignee: ORANGE, Paris (FR)

( * ) Notice: Subject to any disclaimer, the term of this patent is extended or adjusted under 35 U.S.C. 154(b) by 102 days.

(21) Appl. No.: 13/806,738

(22) PCT Filed: Jun. 20, 2011

(86) PCT No.: PCT/FR2011/051413
§ 371 (c)(1),
(2), (4) Date: Dec. 21, 2012

(87) PCT Pub. No.: WO2012/001266
PCT Pub. Date: Jan. 5, 2012

(65) Prior Publication Data
US 2013/0100941 A1 Apr. 25, 2013

(30) Foreign Application Priority Data

Jun. 29, 2010 (FR) ..................................... 10 55191
Nov. 26, 2010 (FR) ..................................... 10 59784

(51) Int. Cl.
H04L 12/26 (2006.01)
H04J 3/14 (2006.01)
H04W 72/04 (2009.01)
H04W 74/08 (2009.01)

(52) U.S. Cl.
CPC ...... *H04W 72/0446* (2013.01); *H04W 74/0816* (2013.01)

(58) Field of Classification Search
USPC ........... 370/252–347, 437–443; 455/452–455
See application file for complete search history.

(56) References Cited

U.S. PATENT DOCUMENTS

| 5,541,924 | A  | * | 7/1996 | Tran et al. ..................... 370/347 |
| 7,050,452 | B2 | * | 5/2006 | Sugar et al. .................... 370/465 |
| 7,346,080 | B2 | * | 3/2008 | Klotsche ....................... 370/498 |
| 7,729,321 | B2 | * | 6/2010 | Liu .............................. 370/337 |

(Continued)

OTHER PUBLICATIONS

Jamieson, K., Balakrishnan, H., and Tay, Y.C. (2006). Sift: A MAC protocol for event-driven wireless sensor networks. In K. Römer, H. Karl, and F. Mattern (Eds.), *EWSN, Lecture Notes in Computer Science*, vol. 3868 (pp. 260-275). Berlin: Springer-Verlag.

(Continued)

*Primary Examiner* — Man Phan
(74) *Attorney, Agent, or Firm* — Knobbe Martens Olson & Bear LLP

(57) ABSTRACT

A method for a node to transmit data in a telecommunications network is disclosed. In one method aspect, it comprises, selecting a time slot j in a window having a plurality of time slots and preceding a transmission period, listening to time slots preceding the time slot j, wherein the transmission period presents a plurality of transmission channels. Furthermore, the method comprises counting a number of time-slot transmissions during the time slots preceding the time slot j wherein when the number of time-slot transmissions is greater than a threshold, the data transmission is postponed or cancelled. Furthermore, when the number of time-slot transmissions is less than or equal to the threshold, a transmission is made during the time slot j, and one of the transmission channels is determined as a function of the number of time-slot transmissions.

12 Claims, 7 Drawing Sheets

(56) References Cited

U.S. PATENT DOCUMENTS

| | | | |
|---|---|---|---|
| 7,813,318 B2 * | 10/2010 | Hu | 370/329 |
| 8,023,956 B2 * | 9/2011 | Hu | 455/452.1 |
| 8,027,327 B2 * | 9/2011 | Gupta et al. | 370/348 |
| 8,416,750 B1 * | 4/2013 | Vargantwar et al. | 370/337 |
| 8,441,951 B2 * | 5/2013 | Kazmi et al. | 370/252 |
| 2004/0028015 A1 * | 2/2004 | Fouilland et al. | 370/337 |
| 2008/0219286 A1 | 9/2008 | Ji et al. | |
| 2009/0310571 A1 | 12/2009 | Matischek et al. | |
| 2010/0202296 A1 * | 8/2010 | Suzuki et al. | 370/241 |

OTHER PUBLICATIONS

International Search Report mailed Sep. 8, 2011 for International Application No. PCT/FR2011/051413 filed Jun. 20, 2011.

* cited by examiner

COMMUNICATION METHOD

RELATED APPLICATIONS

This application is the U.S. National Phase of Application No. PCT/FR2011/051413 entitled "COMMUNICATION METHOD" filed Jun. 20, 2011, which designated the United States, and which claims the benefit of French Application No. 1055191 filed Jun. 29, 2010, and French Application No. 1059784 filed Nov. 26, 2010.

BACKGROUND OF THE INVENTION

The invention relates to the general field of telecommunications. The invention relates in particular to a medium access control (MAC) protocol.

In a telecommunications network in which a plurality of nodes share a common communications medium, simultaneous transmissions can interfere, causing collisions and loss of packets. This applies in particular to wireless networks such as wireless mesh networks, WiFi local networks, or lossy low power networks (LLNs).

Numerous medium access control networks have been devised for coping with this problem. In particular, the IEEE-802.11 family of protocols relates to WiFi local networks and the IEEE-802.15.4 family of protocols relates to wireless personal networks.

The development of networks of wireless sensors has introduced a new constraint in the design of a MAC protocol, namely efficiency in terms of energy consumption. Thus, so-called "low-power listening" (LPL) MAC protocols have been designed. In that type of protocol, the nodes sleep for long periods, and a transmitter/receiver node pair may be selected to communicate during time of wakefulness. The mechanisms proposed by those protocols for avoiding collisions may be classified in two categories: deterministic mechanisms and probabilistic mechanisms.

Deterministic mechanisms are based on a pre-established plan in which each logical channel is dedicated to a specific node. Such mechanisms adapt poorly to unpredictable traffic or they require the plan to be revised frequently since that leads to large energy expenditure. In addition, extensibility is poorly ensured since any one particular node can use only the channel that is allocated thereto.

Probabilistic mechanisms are based mainly on a carrier sense multiple access (CSMA) mechanism. In particular, several protocols use knowledge about time that is shared between the nodes to act during a fixed contention window to determine which node can transmit during the following time of wakefulness.

For example, the document by K. Jamieson, H. Balakrishnan, and Y. C. Tay, "Sift: a MAC protocol for event-driven wireless sensor networks", published in EWSN (K. Römer, N. Karl, and F. Mattern, eds.), Vol. 3868 of Lecture Notes in Computer Science, pp. 260-275, Springer, 2006, describes a mechanism in which a period of transmission is preceded by a contention window that is subdivided into CW time slots. Each node that has data for transmission selects at random one particular slot r among the CW time slots. Thereafter, during the slots preceding the slot r, the node listens and skips its turn if it hears a transmission. If during the slot r, the node does not skip its turn, then it transmits a signal to mark the time slot r and it verifies that no collision has taken place. At the end of the contention window, the node that was able to transmit during the time slot it selected determines that it can transmit data during the following transmission period.

That solution allows the sole node that is allowed to transmit during the next allocation of the medium to be determined, and for this to be done locally, i.e. on the basis solely of information available at each node. Furthermore, the dimensioning of the mechanism (i.e. the number of slots in the contention window and the probability function used for selecting a slot randomly) can depend on traffic load alone and not on network properties. Finally, that solution makes it possible to adapt to traffic that is varying, including in bursts.

Nevertheless, utilization of the available bandwidth remains limited. If the selected node has little data to transit relative to the capacity of the medium during the allocation duration, then the capacity is under-utilized, since no other node can access the medium during that duration.

The same problem is to be found in document US 2008/0219286, which describes a collision-avoidance mechanism in which a single station is selected to transmit in a second time interval as a function of whether or not contention messages are received in a first time interval.

OBJECT AND SUMMARY OF THE INVENTION

The invention seeks to provide a communications method that does not present at least some of the above-mentioned drawbacks. In particular, the invention seeks to make it possible to achieve good utilization of the available bandwidth.

To this end, the invention provides a communications method executed by a node of a telecommunications network, said node having a data transmission to perform, said method comprising:

- a selection step of selecting a time slot j in a window having a plurality of time slots and preceding a transmission period; and
- a listening step of listening to time slots preceding the time slot j;

the method being characterized in that said transmission period presents a plurality of transmission channels, and in that the method comprises:

- a counting step of counting a number of time-slot transmissions during said time slots preceding the time slot j;
- when the number of time-slot transmissions is greater than a predetermined threshold, a postponement or canceling step of postponing or canceling said data transmission; and
- when the number of time-slot transmissions is less than or equal to the predetermined threshold, a time-slot transmission step of transmitting during the time slot j, and a determination step of determining one of said transmission channels as a function of said number of time-slot transmissions.

By means of these characteristics, the invention makes it possible to select a plurality of nodes to which it gives authorization to transmit during a transmission period, itself comprising a plurality of transmission channels. When several nodes execute the method in parallel, all of the nodes that have selected a particular time slot from among the first time slots and counting a number of time-slot transmissions that is less than or equal to the threshold will transmit during the time slot they have selected. Thus, these nodes are selected to continue transmission. The other nodes postpone or abandon their transmission of data. Thus, even if the duration of transmission required by a node remains shorter than the duration of the transmission period, the available bandwidth can be utilized by other nodes. The invention thus achieves better utilization of the available bandwidth.

In addition, the communications method makes use solely of information that is available at each node. Thus, the invention allows transmissions to be planned locally.

The determination step may comprise a participation step of participating in a selection mechanism utilizing a contention window determined as a function of said number of time-slot transmissions, and if the node is selected during said selection mechanism, of determining one of said transmission channels corresponding to said contention window.

Thus, if a plurality of nodes have selected the same time slot and have thus counted the same number of time-slot transmissions, the selection mechanism enables one of those nodes to be selected for the transmission channel corresponding to the contention window.

If said node is not selected during said selection mechanism, the determination step may also comprise a second participation step of participating in a second selection mechanism utilizing a second contention window.

This makes it possible to give precedence to the nodes that participated in the first selection mechanism, by enabling them to participate in the second selection mechanism if they were not selected.

After said determination step, the communications method may comprise a sending step of sending an advertisement message indicating a destination for said data transmission that is to be performed. After said sending step, the communications method may also comprise a sleeping step of sleeping until said data transmission. After said postponement or cancellation step, the communications method may also comprise a receiving step of receiving an advertisement message indicating a data transmission for which said node is the destination, and a sleeping step of sleeping until said data transmission for which said node is the destination.

By means of these characteristics, the node saves energy by sleeping while waiting for the data transmission of which it is either the source or the destination.

In an implementation, the communications method further comprises:
 a counting step of counting a total number of time-slot transmissions during said time slots; and
 when the total number of time-slot transmissions is less than the predetermined threshold, a second determination step of determining at least one of said transmission channels as a function of said total number of time-slot transmissions.

Under such circumstances, whenever the number of nodes having data for transmission is less than the number of transmission channels, the invention makes it possible to authorize at least one node to transmit in a plurality of transmission channels. This enables a node to transmit a greater quantity of data. This improves bandwidth utilization when fewer of the nodes have data for transmission.

The second determination step may comprise a participation step of participating in at least one selection mechanism utilizing a contention window determined as a function of said total number of time-slot transmissions, and if the node is selected during said selection mechanism, of determining one of said transmission channels corresponding to said contention window.

The selection mechanism enables one node to be selected from a plurality of nodes that, after counting the same total number of time-slot transmissions, all participate in the selection mechanism.

The invention also provides a communications node for performing a data transmission in a telecommunications network, said node comprising:
 selection means for selecting a time slot j in a contention window having a plurality of time slots and preceding a transmission period; and
 listening means for listening to time slots preceding the time slot j;
 the node being characterized in that said transmission period presents a plurality of transmission channels, and in that the node comprises:
  counter means for counting a number of time-slot transmissions during said time slots preceding the time slot j;
  postponement or cancellation means for postponing or canceling said data transmission when the number of time-slot transmissions is greater than a threshold; and
  transmission means for transmitting during the time slot j and determination means for determining one of said transmission channels as a function of said number of time-slot transmissions when the number of time-slot transmissions is less than or equal to the threshold.

The invention also provides a communications network comprising a plurality of nodes of the invention.

The advantages and characteristics mentioned with reference to the communications method apply in corresponding manner to the node and to the network.

The invention also provides a computer program including instructions for executing steps of the above-specified communications method when said program is executed by a computer.

The program may use any programming language, and it may be in the form of source code, object code, or code intermediate between source code and object code, such as a partially compiled form, or in any other desirable form.

The invention also provides a computer-readable data medium or recording medium, the medium including instructions of a computer program as mentioned above.

The above-mentioned data or recording media may be any entity or device capable of storing the program. For example, the medium may comprise storage means, such as a read-only memory (ROM), e.g. a compact disk (CD) ROM, or a microelectronic circuit ROM, or indeed magnetic recording means, e.g. a floppy disk or a hard disk.

Furthermore, the data or recording media may correspond to a transmissible medium such as an electrical or optical signal suitable for being conveyed via an electrical or optical cable, by radio, or by other means. The program of the invention may in particular be downloaded from an Internet type network.

Alternatively, the data or recording media may comprise an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF IMPLEMENTATIONS

Figure 1:
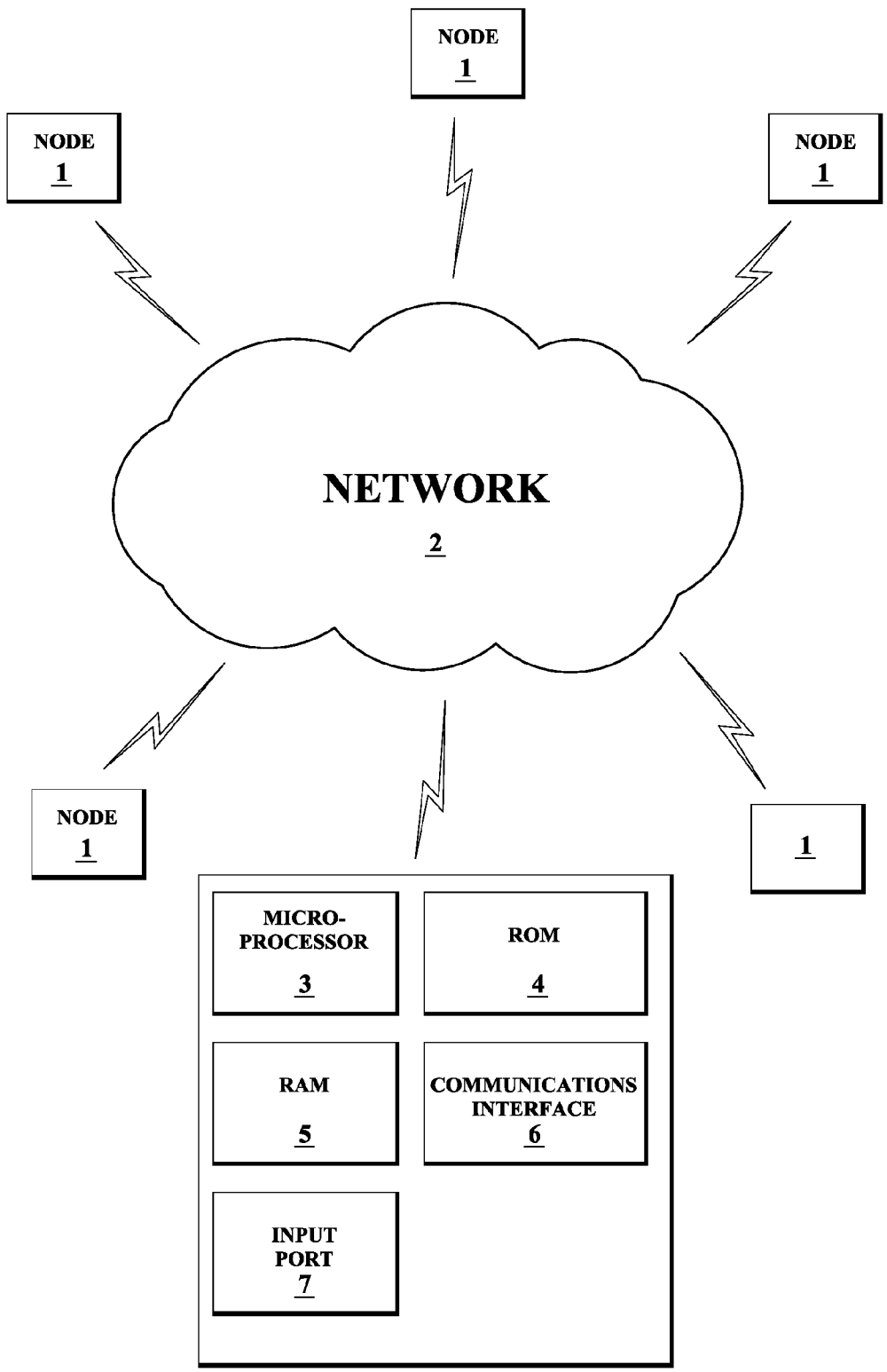
FIG. 1 is a diagrammatic view of a network in an embodiment of the invention.

FIG. 1 shows a network 2 comprising a plurality of nodes 1. By way of example, the network 2 is a wireless network of low-consumption sensors in which the nodes 1 can switch between a sleeping state in which they consume little energy and a wakeful state in which they are capable of sending and receiving data, in particular data relating to values measured by sensors. Nevertheless, the invention is not limited to this type of network and may in particular relate to a network of links over any kind of shared medium.

Each node 1 presents the hardware architecture of a computer. One of the nodes 1 is shown in greater detail in FIG. 1 and comprises a microprocessor 3, a ROM 4, a random access memory (RAM) 5, a communications interface 6, and an input port 7. The microprocessor 3 serves to execute programs stored in the ROM 4 while making use of the RAM 5. The communications interface 6 serves to communicate over the wireless link with the other nodes 1 of the network 2. Finally, the inlet port 7 serves to acquire the value of a measurement signal.

The ROM 4 constitutes a data medium that is readable by the microprocessor 3. It includes instructions of a computer program for which the main steps shown as flowcharts in FIGS. 3 to 6 serve to execute a communications method in a first implementation of the invention, as performed by the node 1.

Periodically, or as a function of the value of the measurement signal acquired by its input port 7, each node 1 decides to transmit data over the network 2. In order to avoid collisions and losses of packets, each node 1 implements a collision-avoidance mechanism that is described in greater detail below.

Figure 2:
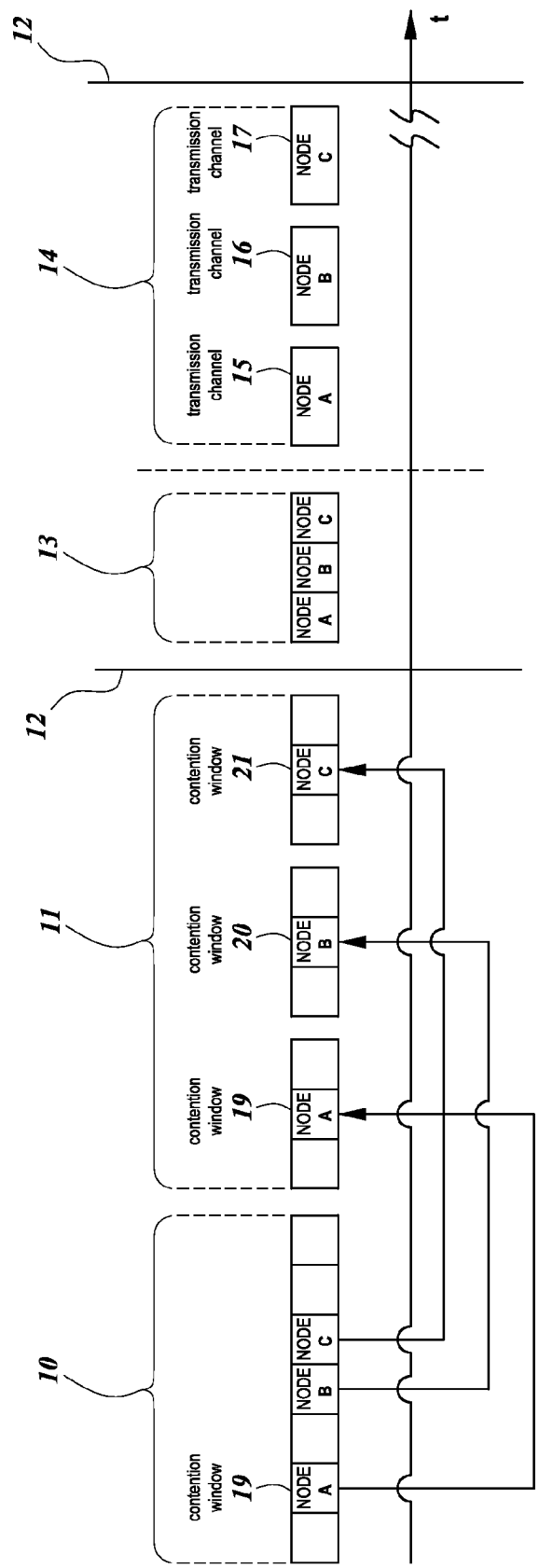
FIG. 2 shows an example of how a communication is conducted in the FIG. 1 network.

FIG. 2 shows how a communication over the network 2 is conducted as a function of time. The nodes 1 have shared knowledge of time t. Thus, they can switch periodically into their wakeful state at instants 12 that are common to all of the nodes 1. The communication is conducted in two stages 10, 11 that precede the instant 12 of switching to the wakeful state, and then two stages 13 and 14 that follow the instant 12.

The purposes of the stages 10 and 11 is to determine which nodes 1 are to be authorized to transmit. The stage 13 is an advertisement stage in which the nodes 1 that are authorized to transmit indicate the nodes 1 that constitute the destinations of their communications. Finally, the stage 14 is a transmission period during which the nodes 1 that are authorized to transmit actually transmit the data for transmission.

The transmission period of the stage 14 presents a plurality of transmission channels. In the example shown in FIG. 2, the transmission period has three transmission channels 15, 16, and 17 that are time-division multiplexed. In a variant, the transmission period could have a greater or smaller number of transmission channels. Also in a variant, the transmission channels could be frequency-division multiplexed.

The stages 10 and 11 enable a collision-avoidance mechanism to be performed in two portions, with the purpose of selecting the three nodes 1 that are to be authorized to transmit respectively in the transmission channels 15, 16, and 17. Naturally, if the transmission period has a number of transmission channels that is greater than or less than three, the number of nodes 1 that are selected during the stages 10 and 11 should be adapted accordingly.

FIGS. 3 to 6 are flowcharts showing the communications method performed by each node 1 to enable a communication to be conducted as shown in FIG. 2.

Figure 3:
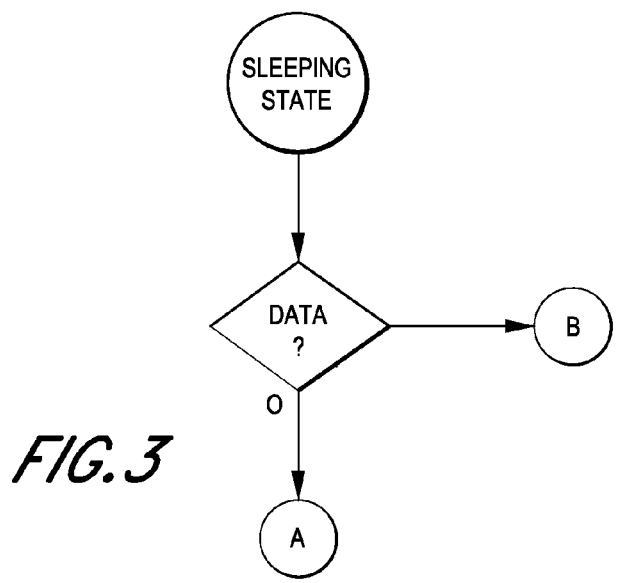
FIGS. 3 to 6 are flowcharts illustrating a communications method in a first implementation of the invention.

In a step 30 of FIG. 3, which precedes the stage 10, the node 1 is in its sleeping state, which is represented by the symbol "S" in the figures. In step 31, the node 1 determines whether it has data for transmission. If the node 1 does not have data for transmission, it goes to a step 40 of FIG. 4. If it has data for transmission, it goes to a step 50 of FIG. 5.

Figure 4:
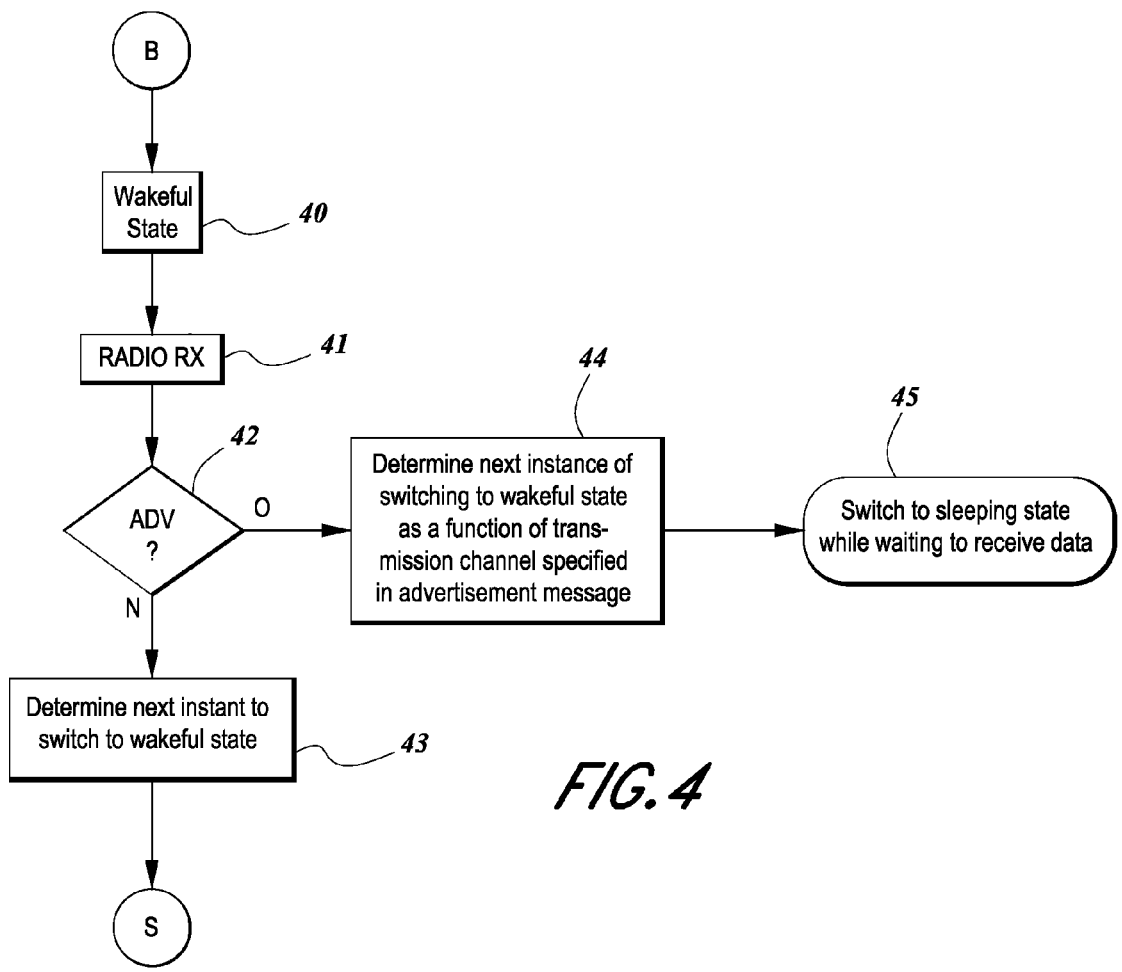

FIG. 4 thus represents the steps performed by a node 1 that does not have data for transmission. In step 40, the node 1 waits for the instant 12 for communicating in its wakeful state, which is represented by the symbol "W". Therefore, in step 41, the node 1 listens for any messages received on its communications interface 6, which is symbolized as "RADIO RX".

In step 42, the node 1 determines whether any of the received messages is an advertisement message concerning a communication for which it is the destination, with this being symbolized by "ADV?".

If there is no advertisement message indicating that it is to be the destination of a communication, then the node 1 acts in a step 43 to determine the next instant 12 at which it will switch to the wakeful state, with this being symbolized by "W= . . . ". Finally, the node 1 switches to the sleeping state.

If there is an advertisement indicating that there is a communication for which it is the destination, the node 1 acts in a step 44 to determine its next instant of switching to the wakeful state as a function of the transmission channel specified in the advertisement message, which is symbolized by "W=F (ADV)". For example, if the node 1 is the destination of a communication in transmission channel 17, then the node 1 makes provision for switching to the wakeful state immediately before the beginning of transmission over transmission channel 17.

Thereafter, in a step 45, the node 1 switches to a state of sleeping while waiting to receive data, which is symbolized by "S/D".

The steps 40 to 45 of FIG. 4 correspond to the stage 13 of FIG. 2 for a node 1 that does not have data for transmission.

Figure 5:
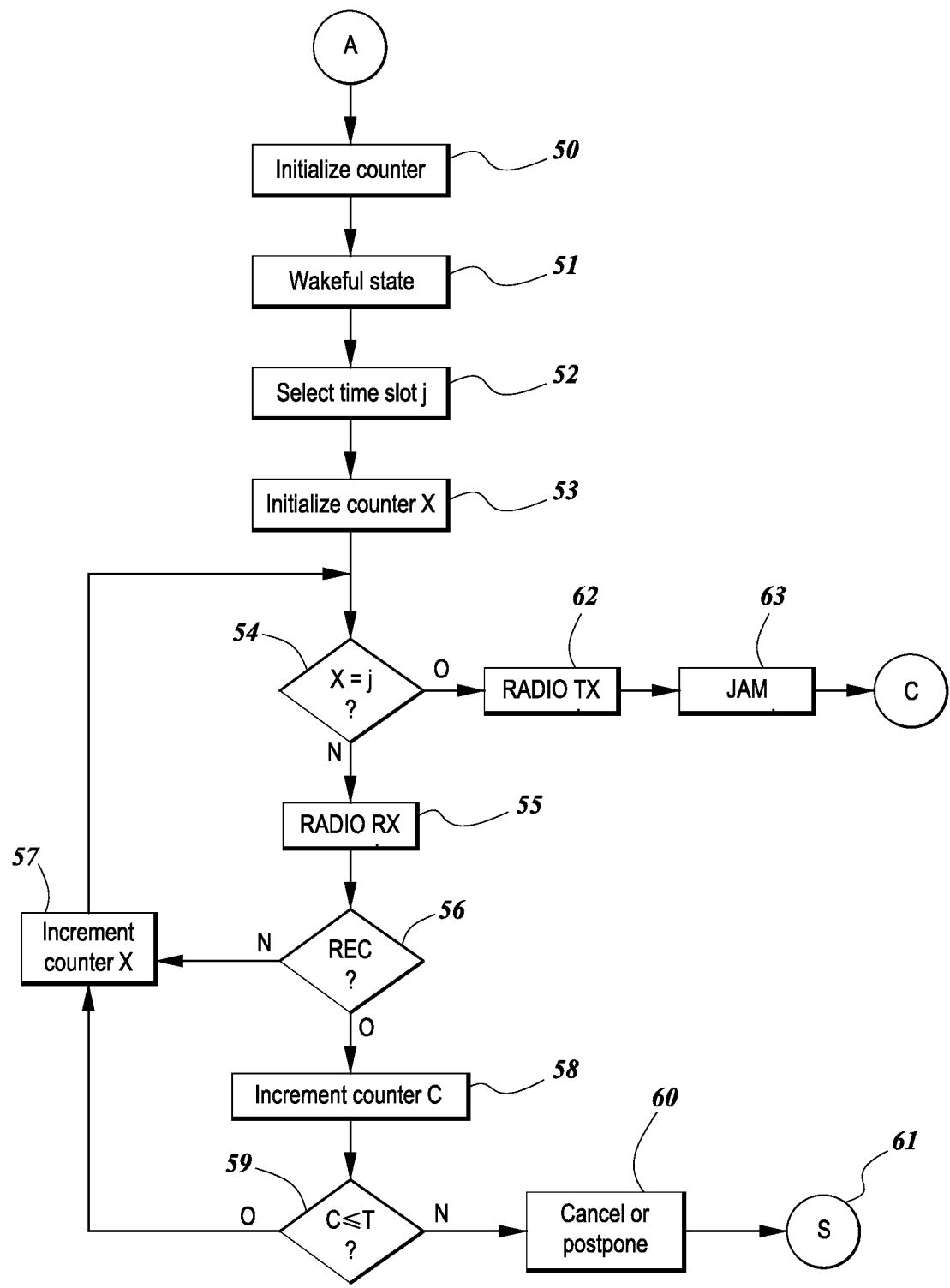

FIG. 5 shows the steps performed by a node 1 that does have data for transmission, as performed during the stage 10 of FIG. 2. The stage 10 serves to perform a first portion of the collision-avoidance mechanism by using a contention window 18 that is subdivided into a plurality of time slots. In FIG. 2, the contention window 18 is subdivided into seven time slots. In a variant, the contention window 18 could be subdivided into a greater or smaller number of time slots.

In step 50, the node 1 initializes a counter C to 1. Then, in a step 51, the node 1 waits for an instant corresponding to the beginning of the stage 10 in order to switch to the wakeful state.

In a step 52, the node 1 randomly selects a time slot j in the contention window 18. The probability function used for selecting the time slot j is preferably a geometrically increasing distribution of the type described in the Sift document mentioned in the introduction.

Thereafter, in a step 53, a counter X representing the current time slot is initialized to 1. Then, in a step 54, the node 1 determines whether the current slot represented by the counter X corresponds to the selected time slot j.

If not, then in a step 55, the node 1 listens for any messages received by its communications interface 6. In a step 56, if no message has been received, the node 1 moves on to a step 57 in which it increments the counter X and then loops back to step 54.

Otherwise, if a message is received, the node 1 moves on to a step 58 and increments the counter C. Thereafter, in a step 59, the node 1 compares the counter C with a threshold T. The threshold T corresponds to the number of transmission channels in the transmission period. Thus, T=3 in the example of FIG. 2.

If the counter C is less than or equal to T, the node 1 moves on to the step 57 where the counter X is incremented, and then loops to the step 54. If the counter C is greater than T, then the node 1 moves on to a step 60 in which it decides to cancel or postpone the data transmission that it is to perform, and then it switches to the sleeping state in a step 61. After the step 61, the node 1 is considered as being a node 1 having no data for transmission, and it therefore performs the steps 40 to 45 of FIG. 4.

If in step 54 the current slot represented by the counter X corresponds to the selected time slot j, then the node 1 passes on to steps 62 and 63 in which it sends a message. By way of example, the message is a jamming signal which is represented by the symbol "JAM". Thus, the time slot j is marked by the node 1.

By listening to the messages received in step 55 and incrementing the counters C and X, the node 1 can thus count those time slots that precede the slot it has selected and that has been marked by other nodes 1. For each time slot preceding the selected time slot j, it is possible that some other node has transmitted a jamming signal JAM. Under such circumstances, the node 1 moves on to the step 58 and increments its counter C.

If more than T time slots preceding the slot that it has selected are marked by other nodes, then in a step 59 the node 1 considers that it cannot transmit its data and it moves on to steps 60 and 61. However, if in step 54 the current slot represented by the counter X corresponds to the selected time slot j, that means that the counter C is less than or equal to T. In other words, the number of time slots that have been marked by other nodes before the time slot j selected by the node 1, which number corresponds to C-1, is less than T-1. Thus, the node 1 can mark the time slot j in steps 62 and 63 and then continue conducting the collision-avoidance mechanism during stage 11 of FIG. 2 by conducting a second portion of the collision-avoidance mechanism.

The nodes 1 that participate in the second portion of the collision-avoidance mechanism are thus nodes that have data for transmission and that have been able to mark a selected time slot j during the stage 10. Thus, for each node 1 that participates in this second portion, the counter C has a value lying in the range 1 to 5.

As shown in FIG. 2, the second portion of the collision-avoidance mechanism makes use of T contention windows, i.e. three contention windows 19, 20, and 21 in the example described. The counter T of each node 1 serves to allocate one of the contention windows 19, 20, and 21 thereto for the second portion of the collision-avoidance mechanism.

Thus, in the invention, a selection mechanism is implemented in each contention window 19, 20, and 21 that enables a single node 1 to be selected that is authorized to transmit over the respective transmission channel 15, 16, or 17 corresponding to the contention window 19, 20, or 21. This second portion of the collision-avoidance mechanism is useful since, during the first portion, it is possible that a plurality of nodes 1 select the same time slot in step 55, and thus have the same value for the counter C.

Advantageously, a node 1 that has not been selected by the selection mechanism of the contention window 19 can participate in the selection mechanism of the contention window 20, and a node 1 that has not been selected by the selection mechanism of the contention window 20 can participate in the selection mechanism of the contention window 21.

Figure 6:
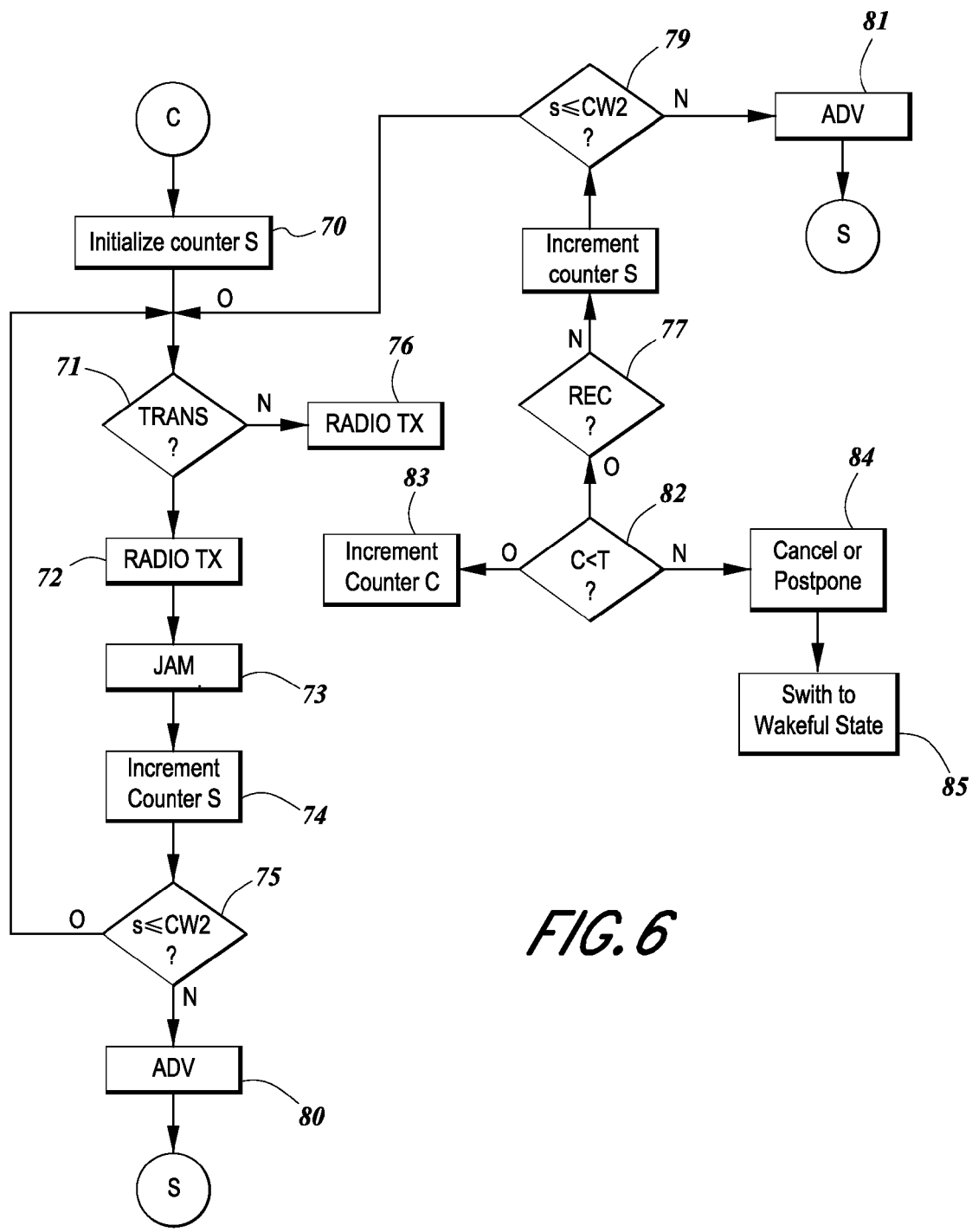

FIG. 6 shows an example of the selection mechanism performed during the contention windows 19, 20, and 21. In this example, the selection mechanism is a mechanism of the binary countdown mechanism (BCM) type in which each contention window is divided into CW2 time slots, each time slot being considered as a selection turn. In a variant, other mechanisms could be used.

The node 1 participates in the selection mechanism of the contention window 19, 20, or 21 as a function of the value of its counter C.

In a step 70, the node 1 initializes a counter s to 1 representing a current slot of the contention window. Thereafter, in step 71, the node 1 decides randomly whether or not it transmits a message for marking the current slot as represented by the counter s. If it does transmit such a message, then in steps 72 and 73, the node 1 transmits a jamming message JAM, and then in a step 74 it increments the counter s.

In a step 75, the node 1 determines whether the counter s is less than or equal to the number CW2 of time slots in the contention window.

If it is, that means that the time slot marked in step 73 was not the last time slot of the contention window. The node 1 thus loops back to step 71. Otherwise, if the time slot marked in step 73 was the last time slot of the contention window, then the node 1 considers that it has been selected to transmit by using the transmission channel that corresponds to its own counter C, and it therefore moves on to a step 80.

The step 80 corresponds to the stage 13 of FIG. 2 in which the nodes 1 that have been selected to transmit an advertisement message indicating the destinations of their transmissions. Thereafter, the node 1 switches to the sleeping state until the beginning of the transmission channel that has been allocated to it.

If, in step 71, the node 1 decides not to mark the current slot represented by the counter s, it moves on to a step 76 in which it listens for any received jamming messages. In a step 77, it determines whether a jamming message has been received.

If, in step 77, a jamming message was received, then the node 1 considers that it has not been selected to transmit by the selection mechanism corresponding to the current contention window. In step 82, it compares the counter C with T. If the counter C is less than T, that means that the current contention window is not the last contention window. Thus, the node 1 increments its counter C in a step 83 and then loops back to the step 70 to participate in the selection mechanism of the following contention window. In contrast, if the contention window is the last, the node 1 considers that it has not been selected to transmit by the collision-avoidance mechanism. Thus, in a step 84, it decides to cancel or postpone the data transmission it is to perform, and in a step 85 it prepares to switch to the wakeful state at the instant 12 prior to switching to the sleeping state. After step 85, the node 1 is considered as being a node 1 that has no data for transmission and it therefore performs the steps 40 to 45 of FIG. 4.

In contrast, if, in step 77, no jamming message is received, then the node 1 continues the selection mechanism of the current contention window. Thus, in a step 78, it increments the counter s and then, in a step 79, it determines whether the current slot is the last of the contention windows. If not, i.e. if the current time slot is not the last time slot of the contention window, the node 1 loops back to step 71. Otherwise, if the current time slot is the last time slot of the contention window, then the node 1 considers that it has been selected to transmit and it therefore moves on to a step 81 identical to the above-described step 80.

With reference to FIG. 2, there follows a more detailed description of how the communication as shown is conducted.

It is assumed that five nodes 1 have data for transmission. During the first portion of the collision-avoidance mechanism, i.e. during the stage 10 and the steps of FIG. 5, these five nodes 1 act in step 52 of FIG. 5 to select respectively the time slots Nos. 2, 4, 5, 6, and 7.

The time slots Nos. 2, 4, and 5 are therefore marked by the corresponding nodes 1, which is represented by the letters A, B, and C. However, the two nodes 1 that selected the time slots Nos. 6 and 7 will count three time slots that have been marked before they reach their own time slots, and they therefore decide to cancel or postpone their own transmissions, after which they switch to the sleeping state in application of steps 59, 60, and 61 of FIG. 5.

After step 63, the three nodes 1 that have marked the time slots Nos. 2, 4, and 5 have the respective values 1, 2, and 3 in their counters C. Thus, the node 1 that marks the time slot No. 2 has its counter C with the value 1, and therefore participates, during the stage 11, in the selection mechanism of the contention window 19. In corresponding manner, the node 1 that marks the time slot 4 has the value 2 in its counter C and it therefore participates the stage 11 in the selection mechanism of the contention window 20, and the node 1 that marks the time slot No. 5 has the value 3 in its counter C and therefore participates during the stage 11 in the selection mechanism of the contention window 21.

Since each of these three nodes 1 is the only node participating in the selection mechanism of its respective contention window, it will be selected as the node authorized to transmit. Naturally, if a plurality of nodes 1 select the same time slot during the stage 10, then those nodes all participate in the selection mechanism of the corresponding contention window in stage 11, thereby leading to one or more nodes being eliminated.

During the advertisement step of stage 13, each of its three nodes 1 sends an advertisement message indicating the node 1 that constitutes the destination for the data that it has for transmission. Thereafter, each of the three nodes 1 that is authorized to transmit actually transmits its data over the transmission channel 15, 16, or 17 that corresponds to its contention window 19, 20, or 21. Thus, in the example shown, the node 1 that selected the time slot No. 2 in the stage 10 and that participated in the selection mechanism of the contention window 19 during the stage 11 transmits its data in the transmission channel 15.

It can be seen that the above-described method makes it possible to select a plurality of nodes that are authorized to transmit during a transmission period having a plurality of transmission channels. Thus, even if the transmission duration required by a node is shorter than the duration of the transmission period, the available passband can be used by other nodes. Furthermore, the two-portion collision-avoidance mechanism is effective in selecting which nodes are authorized to transmit in a manner that is local, i.e. on the basis solely of information available at each node.

The collision-avoidance mechanism also makes it possible to switch each node between its sleeping state and its wakeful state, as a function of requirements. In particular, because of the advertisement step of stage 13, only the nodes participating in a transmission are in the wakeful state during the transmission. The other nodes therefore consume little energy.

Figure 7:
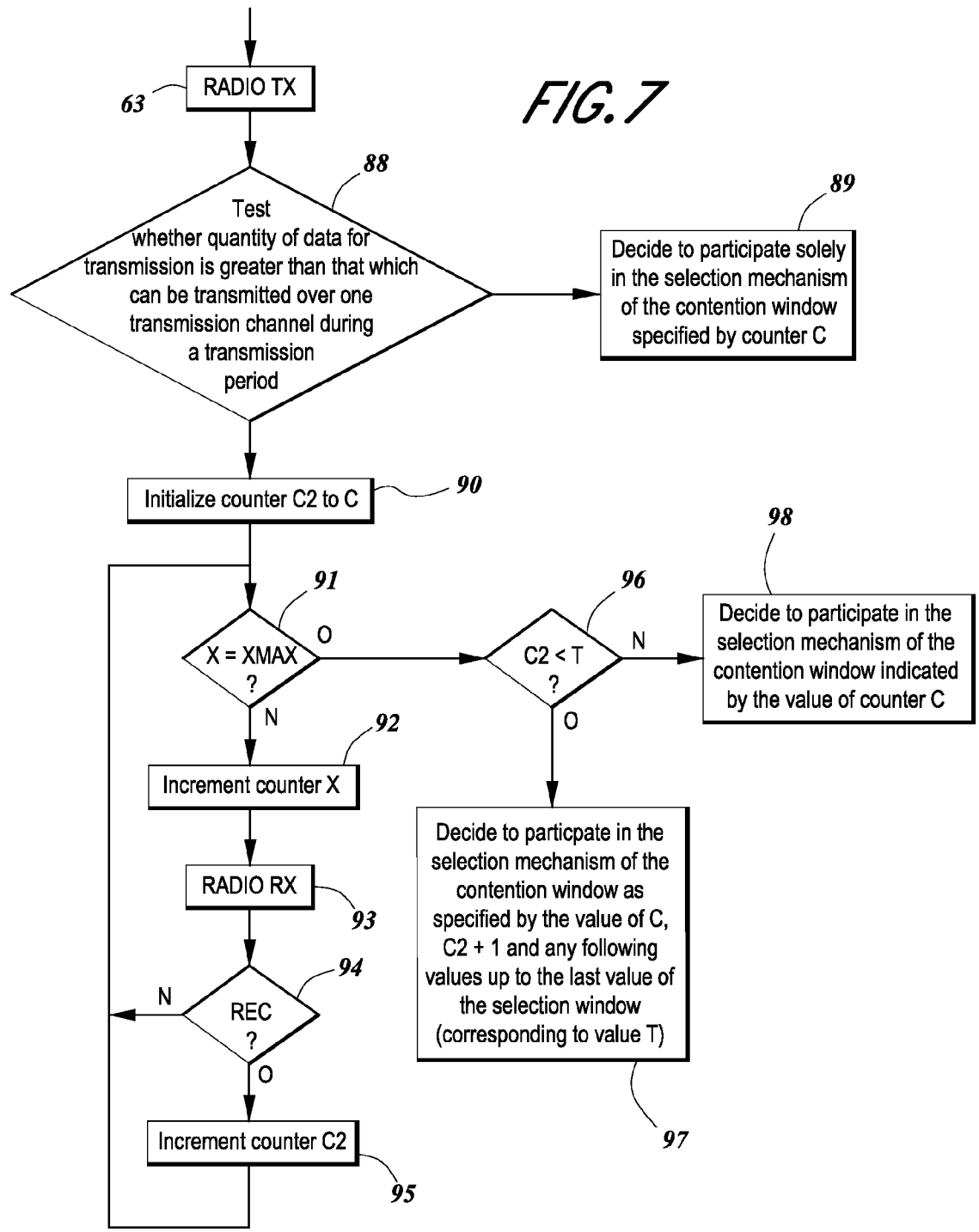
FIG. 7 is a flowchart illustrating steps of a communications method in a second implementation of the invention.
Figure 8:
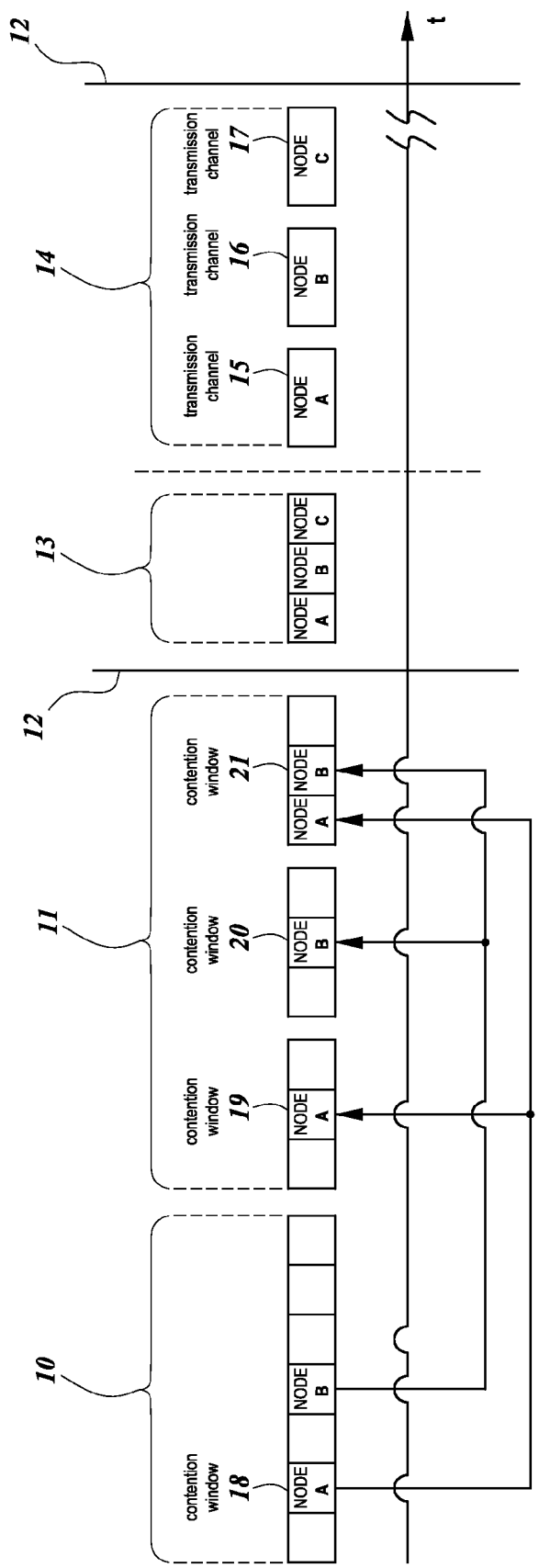
FIG. 8 shows an example of how a communication is conducted in the FIG. 1 network when the nodes implement the communications method of the second implementation of the invention.

With reference to FIGS. 7 and 8, there follows a description of a communications method in a second implementation of the invention.

The communications method of the second implementation of the invention presents characteristics in common with the first implementation of the invention. In particular, the steps described above with reference to FIGS. 3 to 5 are identical in the second implementation.

Nevertheless, in the second implementation, a node 1 that has transmitted a jamming signal in the selected slot j continues stage 10 by listening to the following slots and counting the total number of slots that are marked.

More precisely, FIG. 7 shows the steps performed by a node 1 after the step 63 of FIG. 5.

After the step 63, the counter C of the node 1 contains the number of time slots that have been marked from among the slots 1 to X, for X=j, j being the slot selected by the node 1.

In step 88, the node 1 tests whether it has a quantity of data for transmission that is greater than the quantity of data that can be transmitted over one transmission channel during a transmission period. For example, the quantity of data that can be transmitted over one transmission channel in a transmission period may correspond to one data packet.

If the node 1 does not have more data for transmission than the quantity of data that it is possible to transmit over one transmission channel during a transmission period, then the node 1 moves on to a step 89 where it decides to participate solely in the selection mechanism of the contention window 19, 20, or 21 specified by its counter C. It therefore goes to sleep during the remainder of the contention window 18, thereby enabling energy to be saved.

In contrast, if the node 1 has more data for transmission than the quantity of data that it is possible to transmit over one transmission channel during a transmission period, it moves on to a step 90.

In step 90, a counter C2 is initialized to C. Thereafter, in a step 91, the node 1 compares the counter X with XMAX, i.e. the number of time slots in the contention window 18 (XMAX=7 in the examples shown in FIGS. 2 and 8). If X is not equal to XMAX, that means that there remain time slots for listening to and the node 1 moves on to a step 92.

Thereafter, in step 92, the counter X is incremented. Then, in a step 93, the node 1 listens for any messages received via its communications interface 6.

In a step 94, if a message has been received, the node 1 moves on to a step 95, in which it increments the counter C2 and then loops back to step 91. Otherwise, if no message is received, the node 1 loops back directly to step 91 without incrementing the counter C2.

In step 91, if X is equal to XMAX, that means that all of the time slots of the contention window 18 have been listened to. The node 1 then moves on to step 96.

Steps 90 to 95 thus make it possible to count any time slots in the contention window 18 that follow the slot j selected by the node 1 and that have been marked by other nodes 1. Since the counter C2 is initialized to the value of the counter C in step 90, the counter C2 indicates, in step 96, the total number of time slots that have been marked in the contention window 18.

In step 96, the node 1 compares the counter C2 with the threshold T. As explained above, the threshold T corresponds to the number of transmission channels in the transmission period. Thus, T=3 in the examples of FIGS. 2 and 8.

If C2 is less than the threshold T, that means that fewer than T time slots have been marked by the nodes 1 in the contention window 18. Under such circumstances, the node 1 moves on to a step 97 in which it decides to participate during the stage 11 in the selection mechanism of the contention window 19, 20, or 21 as specified by the value of its counter C. In addition, the node 1 also decides to participate in the selection mechanism of the selection window(s) corresponding to the value C2+1 and any following values, up to the last value of the selection window (corresponding to the value T).

In contrast, if C2 is not less than the threshold T, that means that T time slots have been marked by the nodes 1 in the contention window 18. Under such circumstances, the node 1 moves on to a step 98 where it decides to participate during the stage 11 in the selection mechanism of the contention window 19, 20, or 21 indicated by the value of its counter C.

The selection mechanisms of the contention windows 19, 20, and 21 may be conducted in the same manner as that described in the context of the first implementation, with reference to FIG. 6.

In the second implementation of the communications method, a communication will be conducted in identical manner to that shown in FIG. 2, providing at least T nodes have data for transmission. For example, consider five nodes 1 that have data for transmission. During the first portion of the collision-avoidance mechanism, i.e. during the stage 10 and the steps of FIG. 5, these five nodes 1 act in step 52 of FIG. 5 to select respective time slots Nos. 2, 4, 5, 6, and 7.

The time slots Nos. 2, 4, and 5 are therefore marked by the corresponding nodes 1, as represented by the letters A, B, and C. In contrast, the two nodes 1 that selected the time slots Nos. 6 and 7 count three time slots that have been marked before their own time slots, and therefore decide to cancel or postpone their own transmissions, and they then switch to the sleeping state, in application of steps 59, 60, and 61 of FIG. 5.

After step 63, the three nodes 1 that mark the time slots Nos. 2, 4, and 5 have the respective values 1, 2, and 3 in their counters C. It is thus assumed here that the test in step 88 leads to the step 90 for all three of those nodes 1.

In step 90 of FIG. 7, the node 1 that marks the time slot No. 2 thus initializes its counter C2 to 1, and then increments it twice in step 95 as a result of the time slots Nos. 4 and 5 marked by the other nodes 1. Thus, in step 96, its counter C2 is equal to 3 and it moves on to the step 98.

In corresponding manner, in step 90 of FIG. 7, the node 1 that marks the time slot No. 4 initializes its counter C2 to 2 and then increments it once in step 95 because of the time slot No. 5 marked by another node 1. Thus, its counter C2 is equal to 3 in step 96 and it moves on to step 98.

Finally, in step 90 of FIG. 7, the node 1 that marks the time slot No. 5 initializes its counter C2 to 3 and it does not increment it, since none of the following time slots is marked by another node 1. Thus, its counter C2 is equal to 3 in step 96 and it moves on to step 98.

Under such circumstances, the three nodes that mark the time slots Nos. 2, 4, and 5 will participate in the selection mechanisms of the contention windows 19, 20, and 21 respectively, and will then transmit data respectively over the transmission channels 15, 16, and 17, as represented by the letters A, B, and C in FIG. 2.

However, if fewer than T nodes 1 have data for transmission, then the second implementation enables at least one of the nodes to use a plurality of the T transmission channels. This is illustrated in FIG. 8 which shows an example of how a communication is conducted.

It is considered that two nodes 1 have data for transmission. During the first portion of the collision-avoidance mechanism, i.e. during the stage 10 and the steps of FIG. 5, these two nodes 1 act in step 52 of FIG. 5 to select the time slots Nos. 2 and 4, respectively.

The time slots Nos. 2 and 4 are therefore marked by the corresponding nodes 1, which is represented by the letters A and B. After step 63, the two nodes 1 that mark the time slots Nos. 2 and 4 have the values 1 and 2 in their respective counters C. It is assumed here that the test of step 88 leads to the step 90 for these two nodes 1.

In step 90 of FIG. 7, the node 1 that marks the time slot No. 2 thus initializes its counter C2 to 1, and then increments it once in step 95 because of the time slot No. 4 marked by another node 1. Thus, its counter C2 is equal to 2 in step 96 and it moves on to step 97.

In corresponding manner, in step 90 of FIG. 7, the node 1 that marks the time slot No. 4 initializes its counter C2 to 2, and it does not increment it since none of the following time slots has been marked by another node 1. Thus, in step 96 its counter C2 is equal to 2 and it moves on to step 97.

Thus, the node 1 that marks the time slot No. 2 will participate in the selection mechanism of the contention window 19 corresponding to its counter C and to the selection mechanism of the contention window 21 corresponding to the value C2+1. This is represented by the letter A in FIG. 8.

In corresponding manner, the node 1 that marked the time slot No. 4 will participate in the selection mechanism of the contention window 20 corresponding to its counter C and to the selection mechanism of the contention window 21 corresponding to the value C2+1. This is represented by the letter B in FIG. 8.

It is assumed here that the node 1 represented by the letter A wins the selection mechanism of the contention window 21. Thus, as represented by the letters A and B in the stages 13 and 14 of FIG. 8, the node 1 represented by the letter A transmits data in both transmission channels 15 and 17.

It can be seen that the communications method in the second implementation presents the same advantages as the communications method in the first implementation, but also makes it possible, in the event that the number of nodes having data for transmission is less than the number of transmission channels, to authorize at least one node to transmit in a plurality of transmission channels. This enables a node to transmit a greater quantity of data. Thus, utilization of the passband is improved when only a few nodes have data for transmission.

The invention claimed is:

1. A communications method executed by a node of a telecommunications network, said node having a data transmission to perform, said method comprising:
    selecting a time slot j in a window having a plurality of time slots and preceding a transmission period presenting a plurality of transmission channels; and
    counting a number of said time-slots preceding time-slot j during which at least one time-slot transmission is received;
    when said number of time slots is greater than a number of said plurality of transmission channels, postponing or cancelling said data transmission; and
    when said number of time-slots is less than or equal to said number of said plurality of transmission channels, sending a transmission during time-slot j and determining one of said transmission channels as a function of said number of time slots.

2. A communications method according to claim 1, wherein the determination of one of said transmission channels comprises participating in a selection mechanism utilizing a contention window determined as a function of said number of time slots, and if the node is selected during said selection mechanism, determining one of said transmission channels corresponding to said contention window.

3. A communications method according to claim 2, wherein the determination of one of said transmission channels comprises, if said node is not selected during said selection mechanism, a second participation in a second selection mechanism utilizing a second contention window.

4. A communications method according to claim 1, comprising, after the determination of one of said transmission channels, sending an advertisement message indicating a destination for said data transmission that is to be performed.

5. A communications method according to claim 4, comprising, after sending said advertisement message, sleeping until said data transmission.

6. A communications method according to claim 1, comprising, after said postponement or cancellation receiving an advertisement message indicating a data transmission for which said node is the destination, and sleeping until said data transmission for which said node is the destination.

7. A communications method according to claim 1, further comprising:
    counting a total number of said time-slots in said plurality of time slots in said window during which at least one time-slot transmission is received; and
    when the said total number of time slots is less than said plurality of transmission channels, performing a second determination of at least one of said transmission channels as a function of said total number of time slots.

8. A communications method according to claim 7, wherein said second determination comprises participating in at least one selection mechanism utilizing a contention window determined as a function of said total number of time slots, and if the node is selected during said selection mechanism, of determining one of said transmission channels corresponding to said contention window.

9. A communications node for performing a data transmission in a telecommunications network, said node comprising:
    selection means for selecting a time slot j in a contention window having a plurality of time slots and preceding a transmission period presenting a plurality of transmission channels; and
    counter means for counting a number of said time-slots preceding time-slot j during which at least one time-slot transmission is received;
    postponement or cancellation means for postponing or canceling said data transmission when said number of time slots is greater than a number of said plurality of transmission channels;
    transmission means for transmitting during the time slot j when said number of time-slots is less than or equal to said number of said plurality of transmission channels; and
    determination means for determining one of said transmission channels as a function of said number of time slots.

10. A communications network having a plurality of nodes according to claim 9.

11. A non-transitory computer readable data medium having stored thereon instructions which, when executed by a computer, cause the computer to perform a communications method, said communications method comprising:
    selecting a time slot j in a window having a plurality of time slots and preceding a transmission period presenting a plurality of transmission channels;
    counting a number of said time-slots preceding time-slot j during which at least one time-slot transmission is received;
    postponing or cancelling a data transmission when said number of time slots is greater than a number of said plurality of transmission channels; and
    determining one of said transmission channels as a function of said number of time slots when said number of time slots is less than or equal to said number of said plurality of transmission channels.

12. A communications node for performing a data transmission in a telecommunications network, the node comprising:
    a selection component configured to select a time slot j in a contention window having a plurality of time slots and preceding a transmission period presenting a plurality of transmission channels; and
    a counter component configured to count a number of said time-slots preceding time-slot j during which at least one time-slot transmission is received;
    a postponement or cancellation component configured to cancel or postpone the data transmission when said number of time slots is greater than a number of said plurality of transmission channels;
    a transmission component configured to transmit during the time slot j when said number of time-slots is less than or equal to said number of said plurality of transmission channels; and
    a determination component configured to determine one of the transmission channels as a function of said number of time slots.

* * * * *

UNITED STATES PATENT AND TRADEMARK OFFICE
CERTIFICATE OF CORRECTION

PATENT NO. : 9,100,962 B2
APPLICATION NO. : 13/806738
DATED : August 4, 2015
INVENTOR(S) : Quentin Lampin It is certified that error appears in the above-identified patent and that said Letters Patent is hereby corrected as shown below:

Claims

In column 13 at line 25 (approx.), In Claim 7, change "the said" to --said--.

In column 13 at line 25 (approx.), In Claim 7, after "than" insert --said number of--.

In column 13 at line 34, In Claim 8, change "of determining" to --determining--.

Signed and Sealed this
Twenty-ninth Day of March, 2016

Michelle K. Lee
*Director of the United States Patent and Trademark Office*